United States Patent
Wells

Patent Number: 5,908,163
Date of Patent: *Jun. 1, 1999

[54] SPRAY APPARATUS

[76] Inventor: Joseph H. Wells, 5960 Black Rd., Cable, Ohio 43009

[*] Notice: This patent is subject to a terminal disclaimer.

[21] Appl. No.: 08/905,600

[22] Filed: Aug. 4, 1997

Related U.S. Application Data

[63] Continuation-in-part of application No. 08/556,006, Nov. 13, 1995, Pat. No. 5,653,392.

[51] Int. Cl.$^6$ ....................................... B05B 3/00
[52] U.S. Cl. ........................ 239/722; 239/754; 239/588
[58] Field of Search .................................. 239/722, 754, 239/280, 289, 532, 565, 566, 550, 588, 587, DIG. 1; 134/102.1; 15/320

[56] References Cited

U.S. PATENT DOCUMENTS

| | | |
|---|---|---|
| 964,178 | 7/1910 | Opitz et al. . |
| 2,889,994 | 6/1959 | French . |
| 3,508,709 | 4/1970 | Small et al. . |
| 3,770,210 | 11/1973 | Veltkamp . |
| 4,022,382 | 5/1977 | Engdahl, Jr. . |
| 4,083,495 | 4/1978 | Sharp . |
| 4,580,726 | 4/1986 | Unger . |
| 4,984,746 | 1/1991 | Joyal . |

FOREIGN PATENT DOCUMENTS

| | | |
|---|---|---|
| 586 848 | 6/1934 | Germany . |
| 645 790 | 6/1937 | Germany . |
| 670 074 | 1/1939 | Germany . |
| 733 547 | 3/1943 | Germany . |
| 28 34 596 | 2/1980 | Germany . |
| 1 377 380 | 12/1974 | United Kingdom . |

*Primary Examiner*—Andres Kashnikow
*Assistant Examiner*—Lisa Ann Douglas
*Attorney, Agent, or Firm*—Senniger, Powers, Leavitt & Roedel

[57] ABSTRACT

Apparatus for spraying a fluid under pressure upward onto an undercarriage of a vehicle and downward onto an upward-facing surface. The apparatus includes a conduit adapted for connection to a pressurized fluid source for delivering fluid under pressure from the source and a spray assembly connected to the conduit for movement between an upward spraying position for spraying pressurized fluid toward an undercarriage of a vehicle and a downward spraying position for spraying pressurized fluid toward an upward-facing surface.

14 Claims, 9 Drawing Sheets

SPRAY APPARATUS

This is a continuation-in-part application of patent application Ser. No. 08/556,006, filed Nov. 13, 1995, now U.S. Pat. No. 5,653,392.

BACKGROUND OF THE INVENTION

This invention relates to a spray apparatus for spraying the undercarriages of vehicles and generally upward-facing surfaces such as walks, driveways, patios, lawns, and the like. Although some prior devices have been developed for spraying the undercarriages of vehicles, and others have been developed for spraying walks and such, the inventor is unaware of any prior devices which are adapted to perform both functions.

In general, conventional spray apparatus for spraying undercarriages or upward-facing surfaces rely solely on water pressure from a hose to power the apparatus when spraying the desired surface. Consequently, water is sprayed at a generally constant pressure. However, sometimes dirt and debris cannot be removed from the surface using water pressure alone. In this situation, the user must scrub the surface to remove the dirt or debris, thereby reducing the overall effectiveness of these prior art apparatus.

SUMMARY OF THE INVENTION

Among the several objects and features of the present invention may be noted the provision of a spray apparatus which is adapted for spraying the undercarriages of vehicles and for spraying upward-facing surfaces such as walks and the like; the provision of such an apparatus which directs spray away from the user to reduce splashing the user; the provision of such an apparatus having different length head assemblies for use in spraying the undercarriages of different size vehicles; and the provision of such an apparatus which has means for adjusting the pressure of the spray.

Briefly, apparatus of this invention comprises a tube adapted for connection to a pressurized fluid source for delivering fluid under pressure from the source, and a spray assembly connected to the tube for movement between an upward spraying position for spraying pressurized fluid toward an undercarriage of a vehicle and a downward spraying position for spraying pressurized fluid toward an upward-facing surface.

In another aspect of the invention, the apparatus comprises a tube adapted for connection to a pressurized fluid source for delivering fluid under pressure from the source, a handle connected to the tube for holding and manipulating the apparatus, and a spray assembly connected to the tube. The spray assembly has a plurality of nozzles positioned for directing pressurized fluid toward an undercarriage of a vehicle. Each of the nozzles is directed away from the handle to reduce splashing users of the apparatus.

In yet another aspect of the present invention, the apparatus comprises a first conduit adapted for connection to a first pressurized fluid source for delivering a first fluid under pressure from the first source, and a second conduit adapted for connection to a second pressurized fluid source for delivering a second fluid under pressure from the second source. The apparatus also comprises a spray assembly connected to the first and second conduits for directing the first and second pressurized fluids toward a selected location, and a valve connected to the second conduit for controlling fluid flow from the second fluid source for selectively varying flow rate through the second conduit. Thus, the valve adjusts the pressure of fluid sprayed from the spray assembly.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
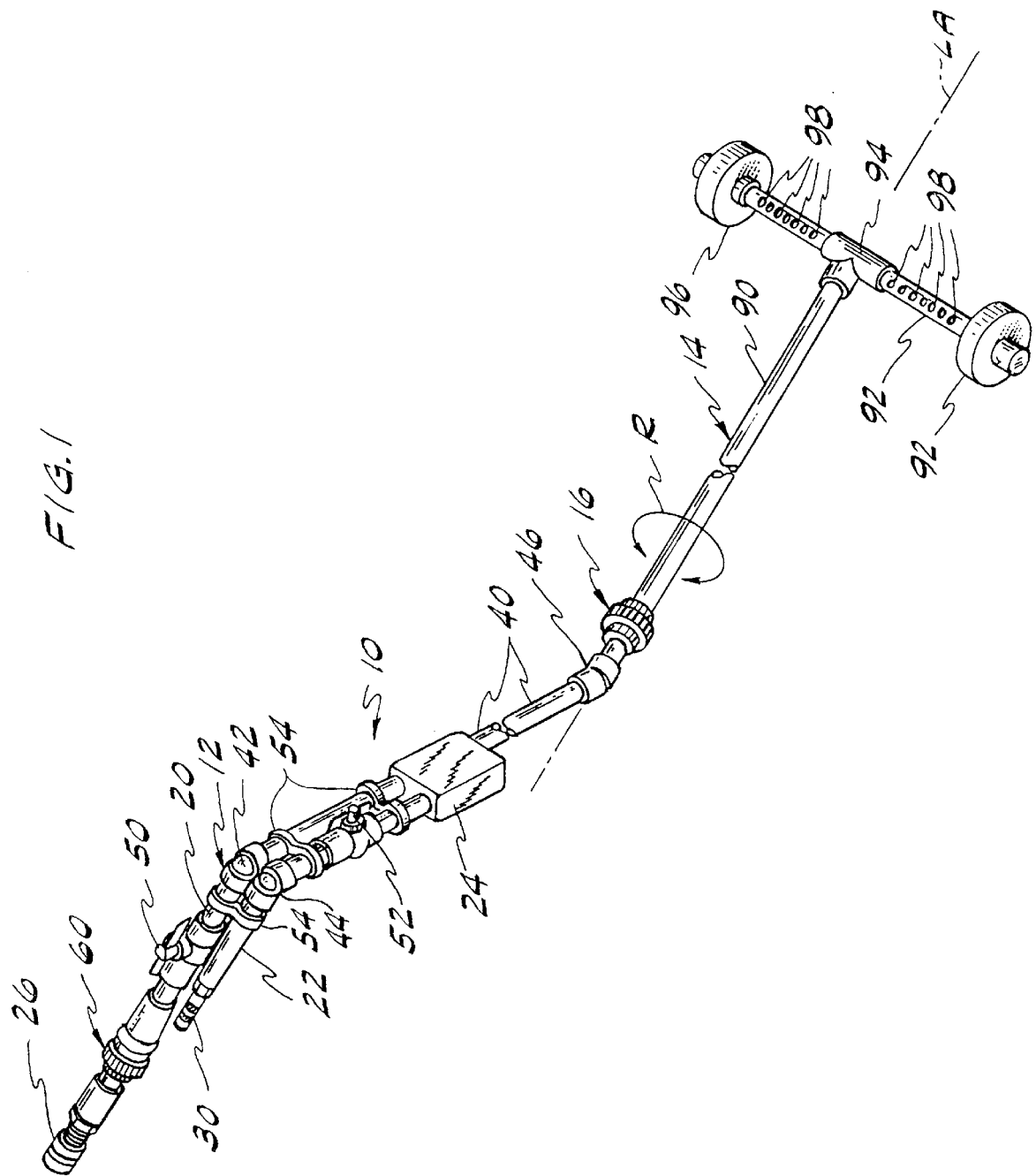
FIG. 1 is a perspective of a spray apparatus according to the present invention.

Referring now to the drawings and in particular to FIG. 1, a spray apparatus according to the present invention is generally indicated by the reference numeral 10. The spray apparatus 10 generally comprises a fluid supply assembly (generally designated 12) and a spray assembly or spray head (generally designated 14), joined by a union (generally designated 16) which enables the spray assembly to be selectively rotated about a generally longitudinal axis LA as indicated by the double headed arrow R.

Figure 2:
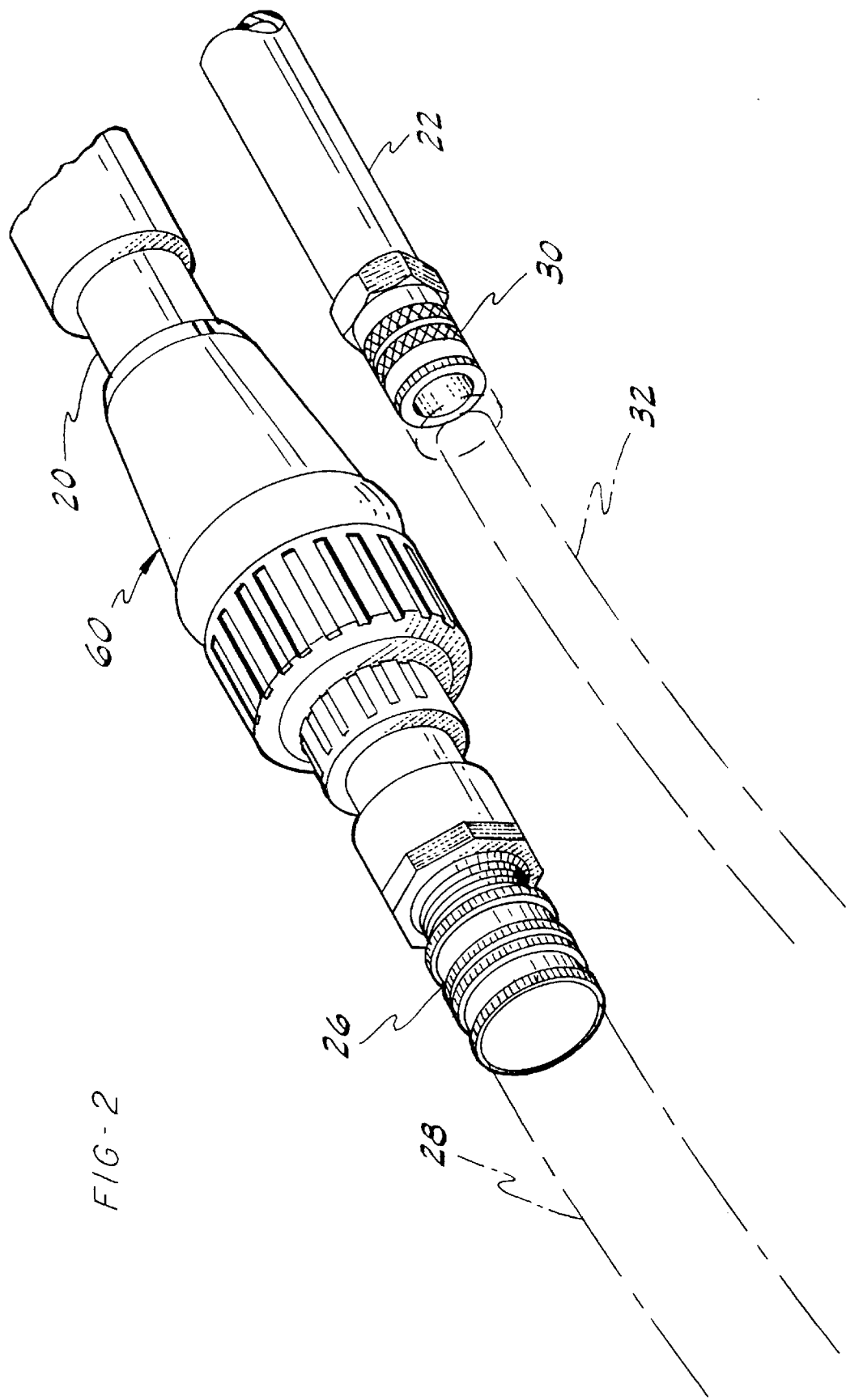
FIG. 2 is a perspective of input connections of the spray apparatus.

The fluid supply assembly 12 includes first and second tubes 20, 22, respectively, joined by a manifold or mixing box 24 having a Y-shaped interior passage. A coupler 26 attached to the upper end of the first tube 20 is provided to connect the spray apparatus 10 to a suitable supply line 28 (FIG. 2) (e.g., a conventional garden hose) for delivering pressurized water or other fluid (e.g., a soap solution or diluted acid) to the apparatus from an external source. Although other couplers may be used without departing from the scope of the present invention, the coupler 26 of the preferred embodiment is a conventional threaded coupler adapted for connection to garden hoses. A second coupler 30 attached to the upper end of the second tube 22 permits connection to another supply line 32 (FIG. 2) (e.g., a conventional air hose) connected to a pressurized fluid source. Although other couplers may be used without departing from the scope of the present invention, the coupler 30 of the preferred embodiment is a conventional quick disconnect coupler adapted for connection to conventional air hoses. FIG. 2 illustrates the couplers 26, 30 and supply lines 28, 32 of the apparatus 10.

As further illustrated by FIG. 1, the manifold 24 mixes the fluids traveling through the first and second tubes 20, 22. A discharge tube 40 connected to the lower end of the manifold 24 transmits the mixed fluid to the spray assembly 14. Angled joints 42, 44, 46 are positioned along the first, second and discharge tubes 20, 22, 40, respectively. As will be apparent to those skilled in the art, these joints 42, 44, 46 enable the upper end of the fluid supply assembly 12 to be generally horizontal and positioned at a convenient distance (e.g., about 3 feet) above the ground or a surface being sprayed as the apparatus 10 is used. This permits a user to stand without stooping when rolling the apparatus under vehicles as will be explained in greater detail below. Thus, the angled joints 42, 44, 46 provide ergonomic positioning of the upper end of the apparatus 10 during relatively diverse uses. As a result, the upper end of the apparatus 10 may be used as a handle for holding and manipulating the apparatus 10.

In addition, it will be noted that tubes 20, 40 and related angled joints 42, 46 form a first conduit for delivering a first fluid under pressure from a first pressurized source. Tube 22 and angled joint 44 form a second conduit for delivering a second fluid under pressure from a second pressurized source.

Figure 4:
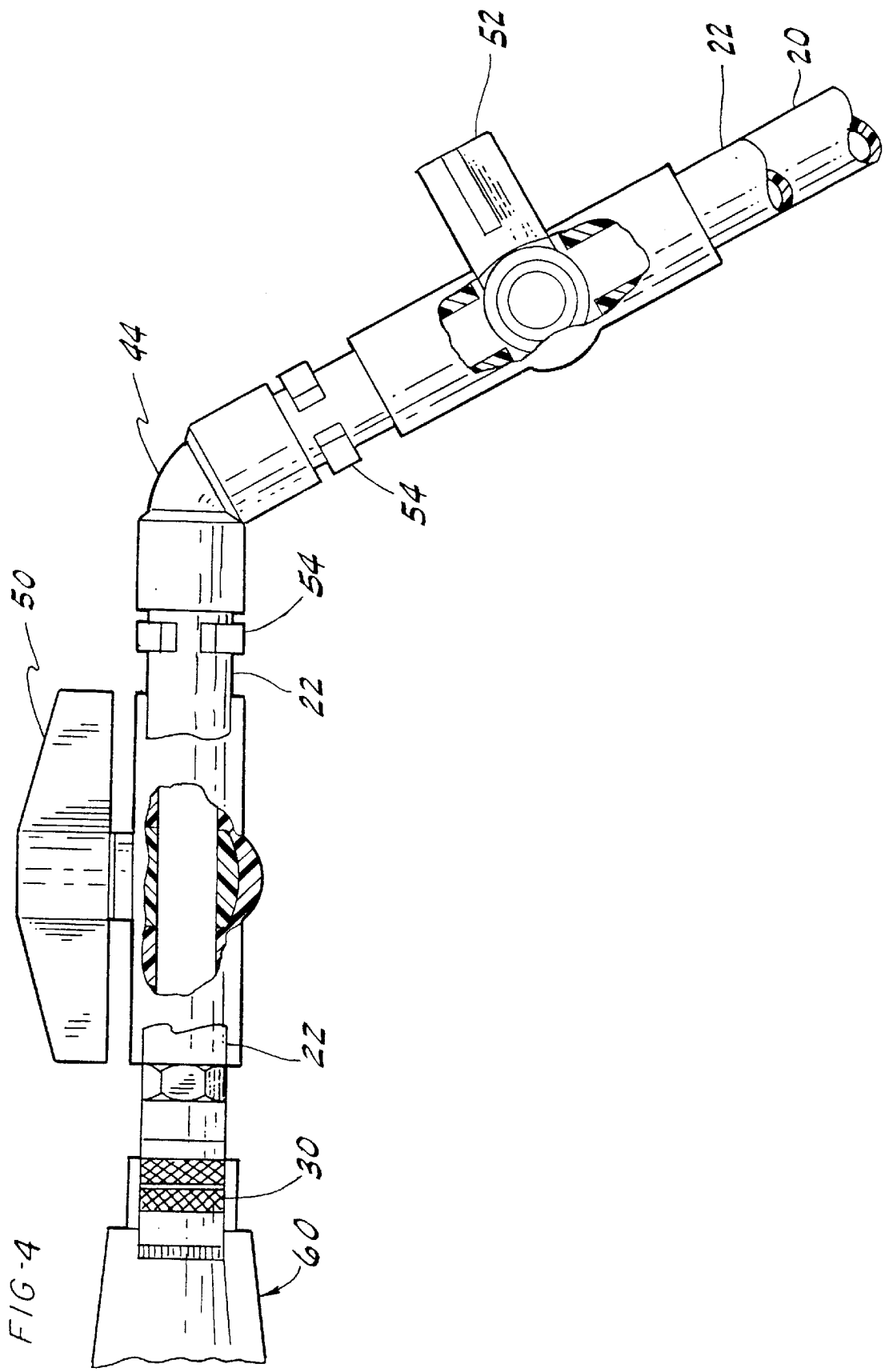
FIG. 4 is a side elevation of a control assembly of the spray apparatus.

Conventional stopcocks or valves 50, 52 positioned along the first and second tubes 20, 22, respectively, form a control assembly to independently control fluid flow through the tubes. Valve 50 may be opened to permit fluid flow through tube 20 and valve 52 may be closed to prevent fluid flow through tube 22 as shown in FIG. 4. When additional pressure is required, valve 52 may be opened to deliver additional pressurized fluid to the spray head 14 to thereby increase the pressure and velocity of fluid sprayed from the apparatus 10. In addition, clamps 54 are provided at intervals along the first and second tubes 20, 22 to prevent their separation.

A check valve 60 positioned upstream from valve 50 prevents backflow through tube 20. For instance, in a typical application water may be supplied through the first tube 20 at a pressure of about 40–60 psi, and air may be supplied to the second tube 22 at a pressure of about 120–150 psi. As will be understood by those skilled in the art, if the check valve 60 were not present, air would be permitted to flow upstream through the first tube 20 and into the water supply system if the apparatus 10 became blocked. The check valve 60 prevents the higher pressure air from backflowing into the first tube 20 in the event flow through the apparatus 10 becomes excessively restricted. In an alternate embodiment, the check valve 60 may be omitted or a second check valve (not shown) may be positioned along the second tube 22 for preventing backflow toward the second fluid source.

Figure 3:
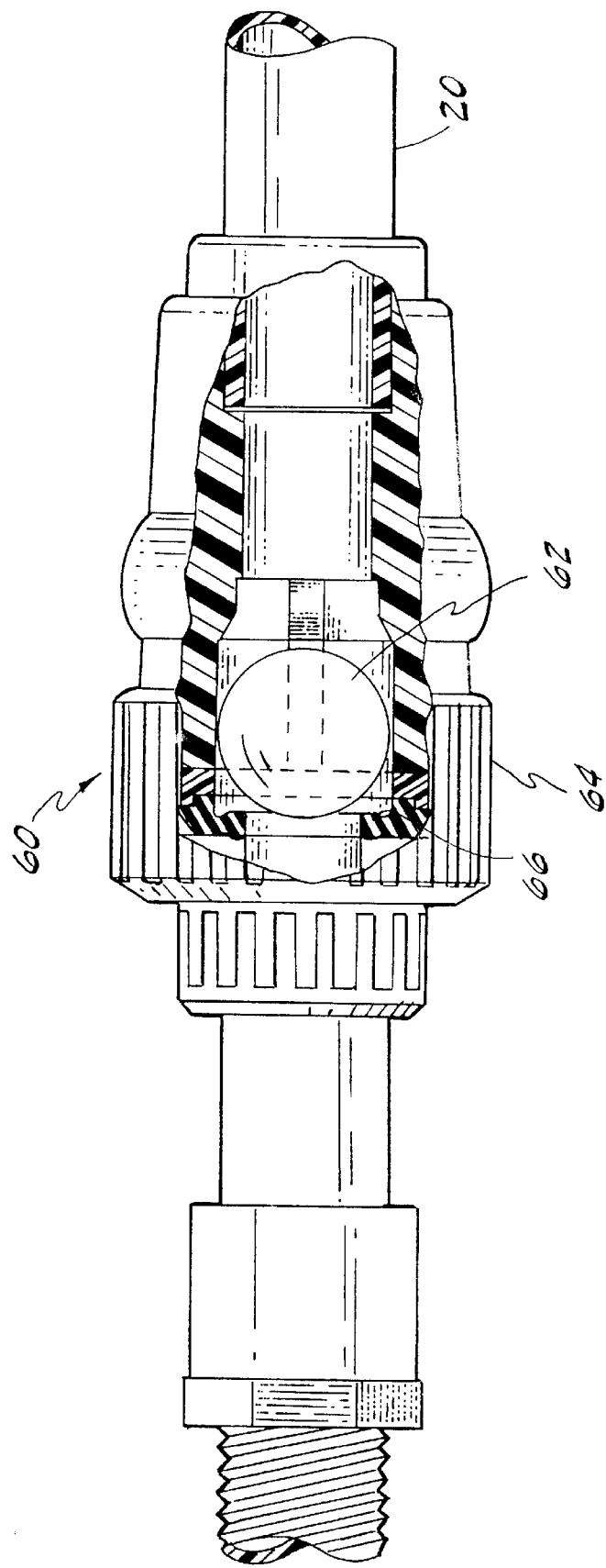
FIG. 3 is a side elevation in partial section of a check valve of the spray apparatus.

As illustrated in FIG. 3, the check valve 60 comprises a ball 62 positioned within a housing 64. When the pressure downstream from the ball 62 is greater than the pressure upstream, as is the case when flow through the apparatus becomes blocked, the ball moves upstream (to the left as shown) and seats against a seat 66 in the housing 64 to prevent backflow. When the pressure upstream from the ball 62 is greater than the pressure downstream, the ball moves downstream away from the seat to permit flow past the ball.

Figure 5:
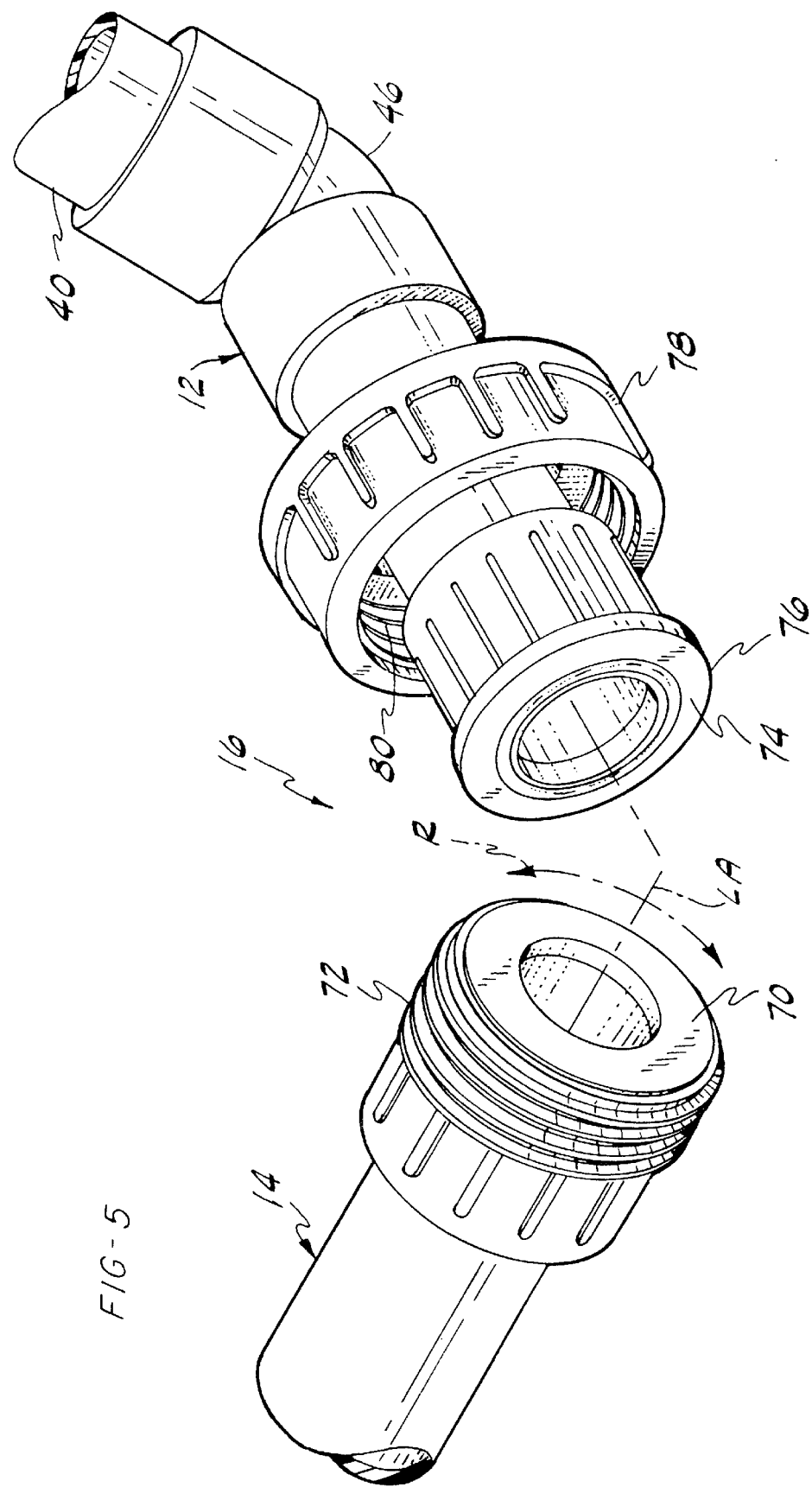
FIG. 5 is a disassembled perspective of a union of the spray apparatus.

As illustrated in FIG. 5, the union 16 comprises a male portion 70 having external threads 72 and a female portion 74 having a flange 76 for retaining a nut 78 having internal threads 80 configured to match and mate with the external threads on the male portion. To join the fluid supply assembly 12 and the spray head 14, the ends of the male and female portions 70, 74 are aligned, and the threads 80 on the nut 78 are engaged with the threads 72 on the male portion. Prior to tightening the nut 78, the spray head 14 may be oriented upward or downward as will be explained in greater detail below. Preferably, the union 16 is a commercially available polyvinyl chloride (PVC) union. Likewise, commercially available PVC valves and tubes are used throughout the apparatus 10 of the preferred embodiment, but it is envisioned that other materials may be used without departing from the scope of the present invention.

Figure 6:
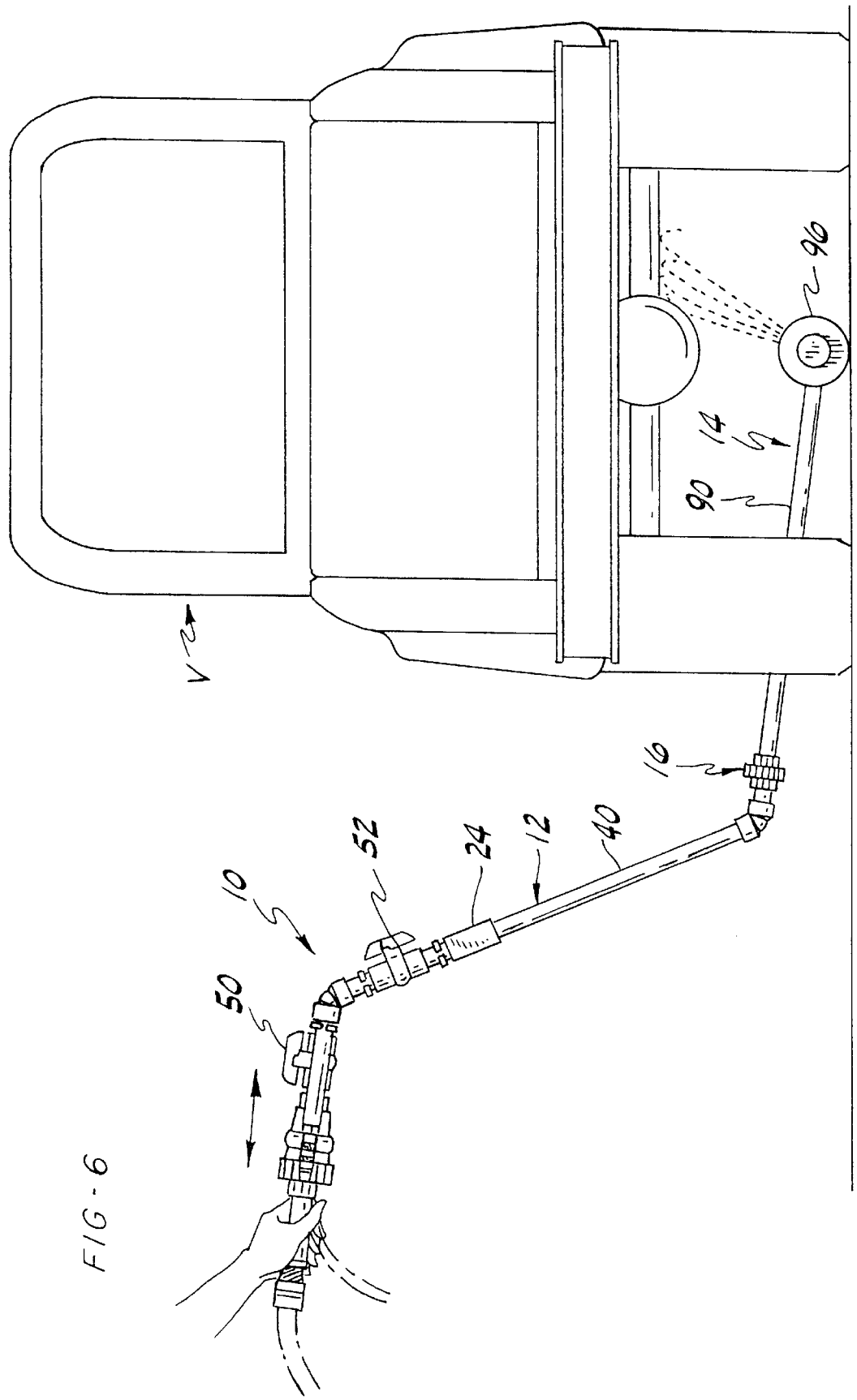
FIG. 6 is a side elevation of the spray apparatus spraying a vehicle undercarriage.
Figure 7:
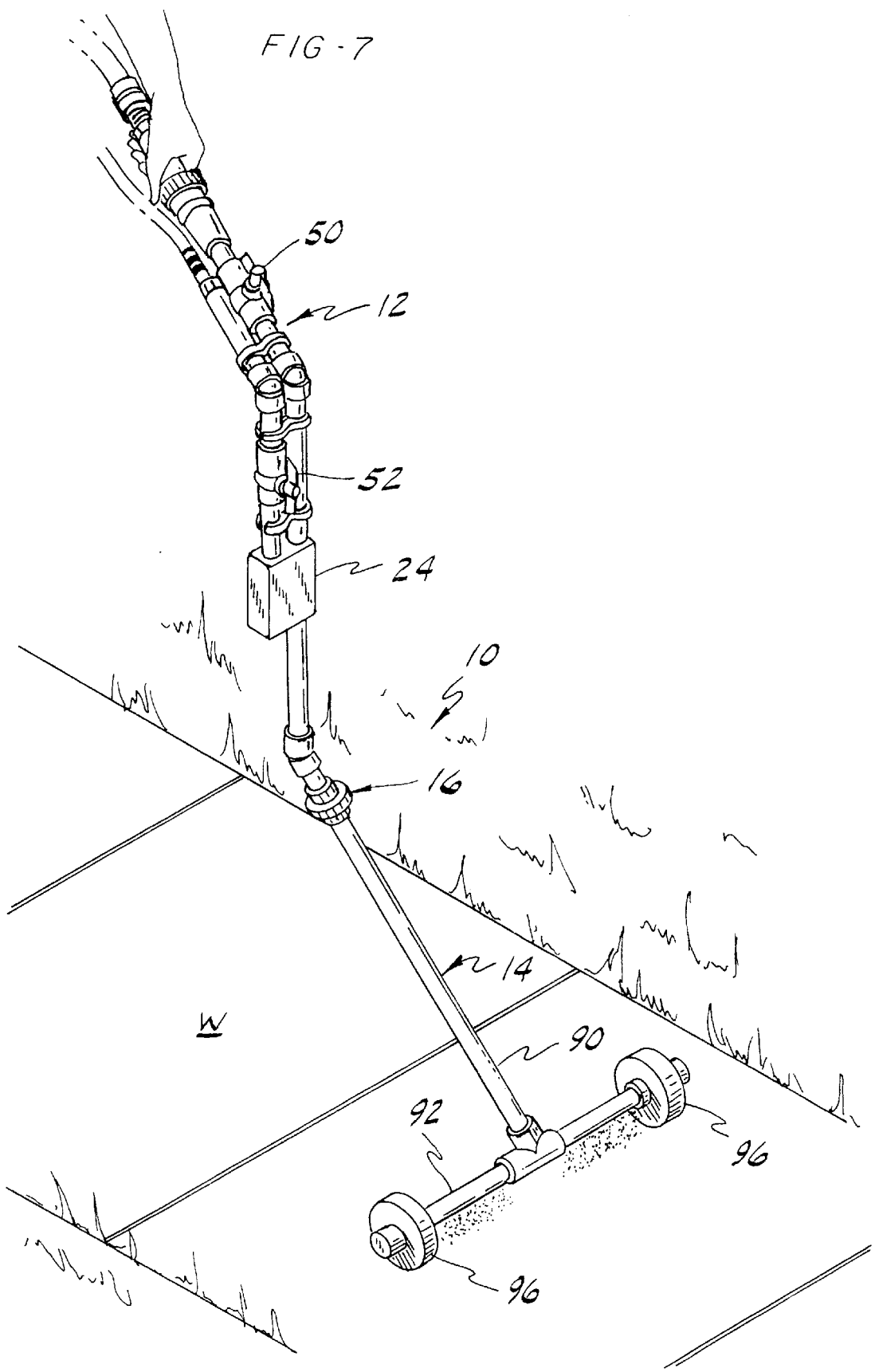
FIG. 7 is a perspective of the spray apparatus spraying a walk.
Figure 9:
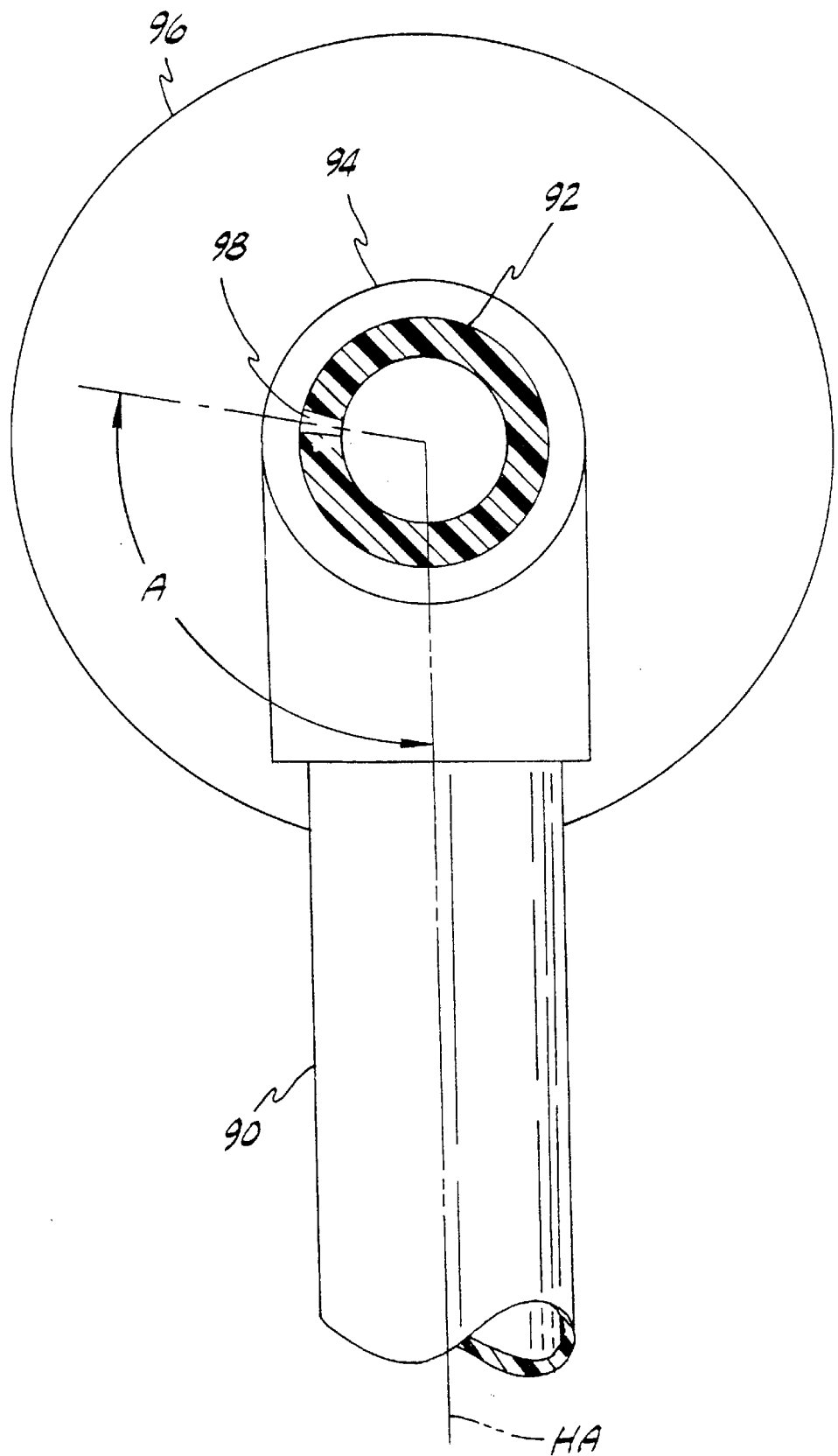
FIG. 9 is a section of a head assembly of the spray apparatus taken in the plane of line 9—9 of FIG. 8.

Referring again to FIG. 1, the spray head 14 comprises an extender tube or feed line 90 and a cross tube 92 joined by a tee fitting 94. Wheels 96 are rotatably mounted on opposite ends of the cross tube 92 for supporting the lower end of the apparatus 10. The wheels 96 space the cross tube 92 a generally constant distance above the ground regardless of the orientation of the extender tube 90. The cross tube 92 is provided with a series of orifices 98 which form nozzles for spraying fluid in a common direction as shown in FIGS. 6 and 7. Although other configurations are also envisioned as being within the scope of the present invention, the orifices 98 of the preferred embodiment are angled away from the upper end (handle) of the apparatus 10 so the angle A between the orifices and the longitudinal axis LA of the extender tube 90 of the spray head 14 is greater than 90° (e.g., about 100°), as shown in FIG. 9.

Referring now to FIG. 6, the apparatus 10 is shown spraying an undercarriage of a vehicle V. For this purpose, the spray head 14 is pivoted so that the orifices 98 face generally upward. The wheels 96 of the apparatus 10 permit the lower end of the apparatus to roll along the ground under the vehicle. The apparatus 10 is connected to a conventional water hose and an air hose. Depending upon the pressure desired, the valve 52 may be opened (as shown) to increase the pressure of the fluid sprayed from the orifices 98. Further, a spray head 14 having a longer extender tube 90 may be used for wider vehicles such as earth moving equipment.

To convert the apparatus 10 for cleaning or sweeping upward-facing surfaces as shown in FIG. 7, the union 16 is loosened, the spray head 14 is rotated 180° about its longitudinal axis LA, and the union 16 is tightened to hold the spray head in the desired orientation. This manipulation results in the configuration illustrated in FIG. 7. As with the undercarriage configuration, the wheels 96 maintain the orifices 98 at an appropriate distance above the ground for optimum cleaning. It will be appreciated that the diameter of wheels 96 must be selected for providing the appropriate vertical positioning of the orifices 98. In general, this diameter should range from about 2 inches to about 4.5 inches. For water pressures and air pressures commonly available in residential areas, and for washing common vehicle undercarriages, a wheel diameter of about 4 inches is preferred.

Figure 8:
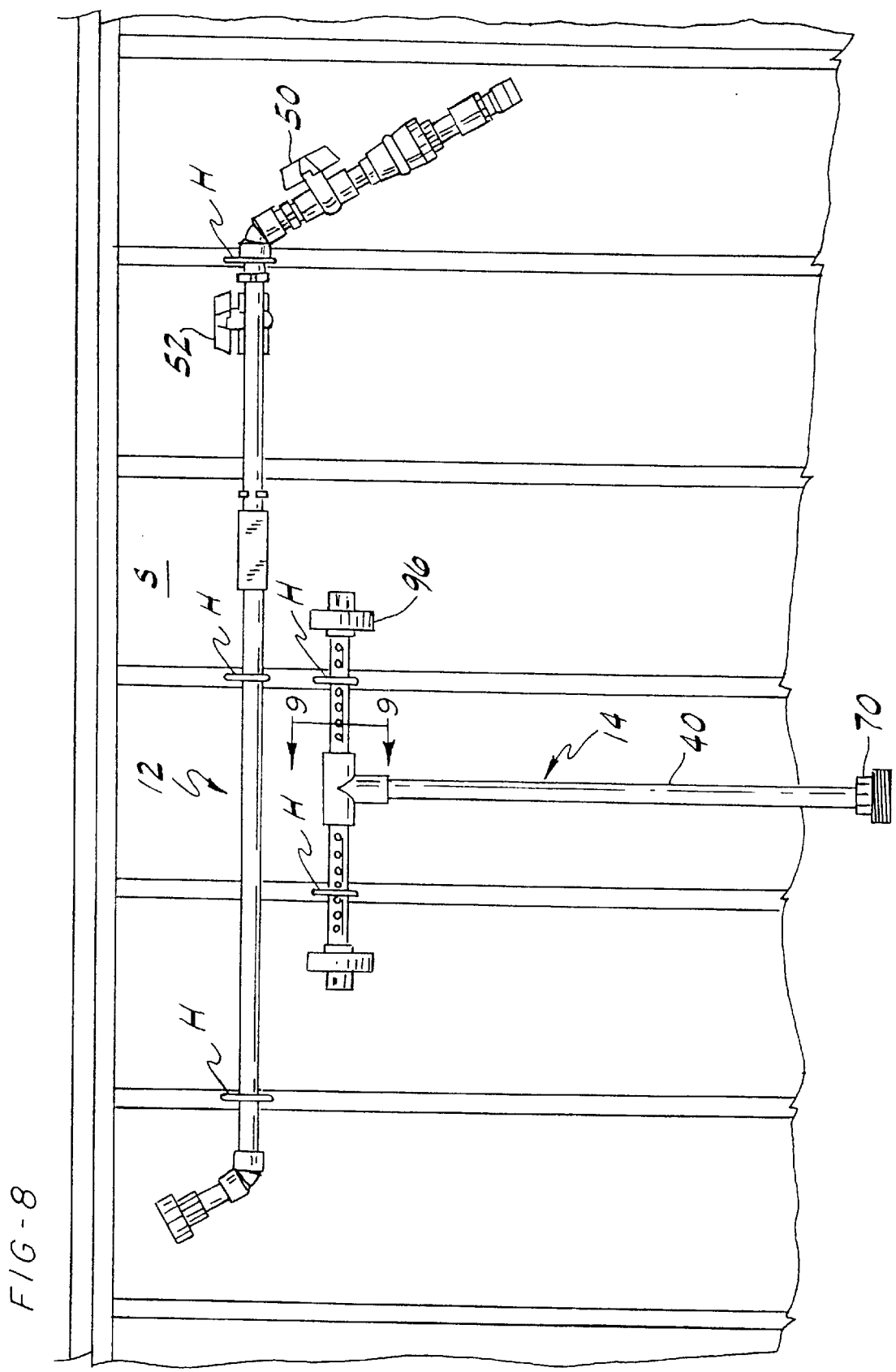
FIG. 8 illustrates the spray apparatus disassembled and stored on a vertical surface.

Storage of the apparatus 10 is accomplished as illustrated in FIG. 8 by separating the water supply assembly 12 and the spray head 14 at the union 16. When disassembled, the water supply assembly 12 and spray head 14 may be conveniently hung from hooks H on a vertical surface S so the apparatus 10 lays flat against the surface.

Although the apparatus 10 is described as being connected to a water source and an air source, other sources are also envisioned as being within the scope of the present invention. For instance, it is envisioned that the first tube 20 could be connected to a pressurized water source and the second tube 22 could be connected to a source of liquid surfactant under pressure so that a surfactant solution could be selectively delivered to the surface being sprayed for loosening dirt and debris to improve cleaning. Alternately, the second tube 22 could be connected to a source of sealant or wax under pressure for spraying the surface after cleaning.

In addition, it is envisioned that the apparatus 10 could be used for other uses besides those described above. For instance, it is envisioned that the apparatus could be used to spray herbicides or fertilizers on the ground.

In an alternate embodiment (not shown), the second tube 22, the corresponding valve 52 and the manifold 24 may be omitted. Still further, it is envisioned that additional tubes (not shown) could be connected to the first and second tubes 20, 22 for spraying additional fluids through the apparatus 10. Each tube could be connected to a manifold (not shown). For instance, one tube (e.g., tube 20) connected to the manifold could deliver water to the spray head 14, another tube (e.g., tube 22) could deliver air, yet another tube could deliver surfactant, and still another could deliver wax.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense. While the form of apparatus herein described constitutes a preferred embodiment of this intention, it is to be understood that the invention is not limited to this precise form of apparatus, and that changes may be made herein without departing from the scope of the intention which is defined in the appended claims.

What is claimed is:

1. Apparatus for spraying a fluid under pressure upward onto an undercarriage of a vehicle and downward onto an upward-facing surface, said apparatus comprising:

a conduit adapted for connection to a pressurized fluid source for delivering fluid under pressure from the source; and a spray assembly connected to the conduit for movement between an upward spraying position for spraying pressurized fluid toward an undercarriage of a vehicle and a downward spraying position for spraying pressurized fluid toward an upward-facing surface.

2. Apparatus as set forth in claim 1 wherein the spray assembly is pivotally connected to the conduit.

3. Apparatus as set forth in claim 2 wherein the conduit and the spray assembly are connected by a separable union.

4. Apparatus as set forth in claim 1 further comprising one or more wheels attached to the spray assembly for rollably supporting said assembly.

5. Apparatus as set forth in claim 1 further comprising a handle connected to the conduit for holding and manipulating the apparatus, wherein the spray assembly has a plurality of nozzles, each of said nozzles being directed away from the handle to reduce splashing users of the apparatus.

6. Apparatus as set forth in claim 1 wherein said fluid source is a first pressurized fluid source, and said conduit is a first conduit adapted for connection to said first pressurized fluid source for delivering fluid under pressure from said first source, and said apparatus further comprises:

a second conduit connected to the spray assembly, said second conduit being adapted for connection to a second pressurized fluid source for delivering fluid under pressure from said second source; and a valve connected to said second conduit for controlling fluid flow from said second fluid source for selectively varying flow rate through said second conduit thereby to adjust the pressure of fluid sprayed from the spray assembly.

7. Apparatus for spraying a fluid under pressure onto an undercarriage of a vehicle, said apparatus comprising:

a conduit adapted for connection to a pressurized fluid source for delivering fluid under pressure from the source;

a handle connected to the conduit for holding and manipulating the apparatus; and a spray assembly connected to the conduit comprising an elongate body having a longitudinal axis and a spray head, the spray head including a plurality of stationary nozzles positioned for directing pressurized fluid upward toward an undercarriage of a vehicle, each of said nozzles being constantly directed more than ninety decrees away from said longitudinal axis to reduce splashing users of the apparatus.

8. Apparatus as set forth in claim 7 wherein said fluid source is a first pressurized fluid source, and said conduit is a first conduit adapted for connection to said first pressurized fluid source for delivering fluid under pressure from said first source, and said apparatus further comprises:

a second conduit connected to the spray assembly, said second conduit being adapted for connection to a second pressurized fluid source for delivering fluid under pressure from said second source; and a valve connected to said second conduit for controlling fluid flow from said second fluid source for selectively varying flow rate through said second conduit thereby to adjust the pressure of fluid sprayed from the spray assembly.

9. Apparatus as set forth in claim 7 wherein each of said nozzles is directed to spray at an angle of about one hundred degrees away from said longitudinal axis.

10. Apparatus for spraying a fluid under pressure comprising:

a first conduit adapted for connection to a first pressurized fluid source for delivering a first fluid under pressure from said first source;

a second conduit adapted for connection to a second pressurized fluid source for delivering a second fluid under pressure from said second source;

a spray assembly connected to said first and second conduits for directing said first and second pressurized fluids toward a selected location; and a valve connected to said second conduit for controlling fluid flow from said second fluid source for selectively varying flow rate through said second conduit thereby to adjust the pressure of fluid sprayed from the spray assembly.

11. Apparatus as set forth in claim 10 further comprising a check valve connected to said first conduit for preventing flow through said first conduit toward said first fluid source.

12. Apparatus as set forth in claim 10 further comprising a manifold having first and second inlets and an outlet, wherein said first conduit comprises a first tube connected to said first inlet of the manifold, and said second conduit comprises a second tube connected to said second inlet of the manifold.

13. Apparatus as set forth in claim 12 wherein said first conduit further comprises a third tube connected to the outlet of the manifold.

14. Apparatus as set forth in claim 10 wherein said valve is a first valve and the apparatus further comprises a second valve connected to said first conduit for controlling fluid flow from said first fluid source for selectively varying flow through said first conduit.

* * * * *